United States Patent [19]
Raudalus et al.

[11] Patent Number: 5,433,335
[45] Date of Patent: Jul. 18, 1995

[54] CONTAINER SYSTEM FOR PRODUCTS

[75] Inventors: Gustavo Raudalus, San Pedro Sula, Honduras; Raul Fernandez; Franklin Sanabria, both of San Jose, Costa Rica; Rodrigo Barsallo, San Jose, Costa Rica; Solomon Chong, San Pedro Sula, Honduras

[73] Assignee: Chiquita Brands, Inc., Cincinnati, Ohio

[21] Appl. No.: 160,890

[22] Filed: Nov. 30, 1993

[51] Int. Cl.$^6$ ............................................. B65D 90/04
[52] U.S. Cl. .................................... 220/403; 383/209
[58] Field of Search ............... 220/403, 410, 461, 462; 383/203, 204, 206, 208, 209; 229/120, 916

[56] References Cited

U.S. PATENT DOCUMENTS

| | | |
|---|---|---|
| 1,653,116 | 12/1927 | Parks . |
| 1,664,308 | 3/1928 | Miller . |
| 3,097,781 | 7/1963 | Masi . |
| 3,393,858 | 7/1968 | Heel .............................. 229/916 X |
| 3,738,568 | 6/1973 | Ruda .............................. 383/203 X |
| 3,782,619 | 1/1974 | Dittbenner . |
| 4,056,223 | 11/1977 | Williams . |
| 4,081,124 | 3/1978 | Hall . |
| 4,572,422 | 2/1986 | Heuberger et al. .................. 220/461 |
| 4,635,814 | 1/1987 | Jones .............................. 220/461 X |
| 4,725,329 | 2/1988 | Tani .............................. 383/206 X |
| 4,777,054 | 10/1988 | Greenhouse .................... 383/209 X |
| 4,872,420 | 10/1989 | Shepard .......................... 220/403 X |
| 5,116,140 | 5/1992 | Hirashima .......................... 383/206 |
| 5,121,877 | 6/1992 | Bodary et al. . |
| 5,130,152 | 7/1992 | Alameda .......................... 229/120 X |
| 5,350,110 | 9/1994 | Will ................................ 220/461 X |

FOREIGN PATENT DOCUMENTS

| | | |
|---|---|---|
| 0216763B1 | 4/1987 | European Pat. Off. . |
| 2128080 | 10/1972 | France . |
| 778310 | 7/1957 | United Kingdom . |
| 2043596 | 10/1980 | United Kingdom . |

*Primary Examiner*—Allan N. Shoap
*Assistant Examiner*—Christopher J. McDonald
*Attorney, Agent, or Firm*—Frost & Jacobs

[57] ABSTRACT

A container system for the shipping and storing of product such as bananas, comprising: (a) a substantially rigid outer container having at least one ventilation opening; (b) a closable inner container positioned within the outer container for receiving the product, the inner container having a bottom portion and a top portion; and (c) means attached to the top portion of the inner container for opening the inner container so as to provide increased ventilation to the product. The inner container preferably comprises a flexible bag having a sealed bottom as its bottom portion, an open top adjacent the top portion, and a perforation extending about at least a portion of the bag, so that the opening means opens the bag by severing the bag at the perforation. The opening means may comprise a cord attached to the top portion of the bag. A method of packing, shipping and storing product, comprising the steps of: (a) providing an inner and outer container for the product at a first location, the outer container being of a substantially rigid construction, and having at least one ventilation opening, and wherein the inner container has a top portion, a bottom portion, and an open end adjacent the top portion; (b) placing the inner container within the outer container; (c) placing the product inside the inner container; (d) providing a means attached to the top portion for opening the inner container; (e) closing the inner container so that the inner container is substantially sealed at the top portion to thus containerize the product; (f) shipping the containerized product to a second location; (g) opening the inner container using the opening means, so as to provide increased ventilation to the product within the inner container through the at least one ventilation opening; and (g) storing the containerized product at the second location. The inner container may comprise a flexible bag having a perforation between the top and bottom portions, so that the opening step severs the bag at the perforation, preferably removing the top portion of the bag, thereby providing the increased ventilation. The opening means may comprise a cord affixed to the top portion of the bag, so that the opening step comprises pulling the cord to remove the top portion of the bag.

17 Claims, 5 Drawing Sheets

CONTAINER SYSTEM FOR PRODUCTS

BACKGROUND OF INVENTION

1. Field of the Invention

This invention relates to an improved container system for products, particularly perishable products such as bananas, and an improved method for packing, shipping and storing products, and, more particularly, to a container system and method which employ a closeable inner container which can be readily opened to provide increased ventilation to the product, an outer container of an optionally improved design, and a means for opening the inner container without a need to access the outer container.

2. Description of Related Art

Most products must be shipped from one point to another prior to their sale to consumers, and are usually stored for a period of time at one or both locations. During shipping and storing, however, ventilation, heating, and/or cooling must often be provided to the products for various reasons. Perishable products such as fruit, for example, may require ventilation and cooling in order to maintain their freshness. Without such ventilation or temperature control means, these products might arrive at their final destination in a spoiled or damaged condition. Thus, it is usually not sufficient to merely package these perishable products in closed containers.

Previous containerization methods for perishable products such as fruits and vegetables have often employed containers having various ventilation means. For example, most fruits are shipped to retailers from the location where they are grown in corrugated boxes having a plurality of ventilation openings. These corrugated boxes not only provide a means for ventilating and controlling the temperature of the fruit, but are also light-weight and relatively inexpensive to manufacture. One drawback of these corrugated containers, however, is that they generally cannot be reused. Thus, any reduction in the amount of materials used in their manufacture is of great value.

Many products such as fruits and vegetables also have ventilation and temperature parameters which must be varied during shipping and storing. Thus, at certain points during the shipping and/or storing periods it may be necessary to increase ventilation, or raise or lower the temperature of the products in order to ensure optimal freshness. One product for which this is particularly true is bananas. Bananas are typically packed into corrugated containers (i.e., boxes) at the plantation where they are harvested in a very green, unripened state. These cardboard boxes are then placed within large shipping containers, which are in turn placed in refrigerated ships. During shipment the pulp temperature of the bananas is kept at a temperature between 56° and 59° F. Once the ship has docked, the bananas are transferred to refrigerated trucks or rail cars, and transported to a warehouse or the like. Once again, the pulp temperature is maintained between 56° and 59° F. in order to retard the ripening of the bananas, thereby prolonging the shelf life of the bananas. In order to maintain this temperature range, it is necessary to provide ventilation means within the cardboard or corrugated boxes. This is typically achieved by providing a plurality of ventilation openings about the surfaces of the boxes. In this fashion cooled air can be circulated within the boxes, thereby maintaining the proper pulp temperature.

Once the bananas have reached the warehouse, the boxes are placed in ripening rooms where the pulp temperature is permitted to rise to about 60° to 62° F. Ethylene gas is also circulated about and within the containers by means of the ventilation openings. The combination of increased temperature and ethylene gas will hasten the ripening process, thereby reducing the time necessary for the bananas to fully ripen. Once this process has been completed, however, it is desirable to remove ethylene gas and decrease the temperature of the bananas in order to decelerate ripening. Since the ripening process within the bananas themselves releases ethylene gas, and since the ripening process will continue even at temperatures below 60° F., it is critical that sufficient ventilation be provided in order to reduce the pulp temperature and remove ethylene. Thus, once the bananas are removed from the ripening rooms and transported to the retailer, it is usually necessary to take steps to ensure that increased ventilation can be provided to the bananas. If the ethylene gas is not removed from the bananas or the temperature is not sufficiently decreased, the bananas will continue to ripen at an accelerated rate, thereby shortening their shelf life. Thus, the containers and packaging employed for bananas must be able to account for the varying ventilation and temperature control needs during the shipping and storing steps.

Other products, including other fruits and vegetables, require similar handling, and may have varying needs during the shipping and storing processes. Thus, there is a need for a container system for products, as well as a method for packing, shipping and storing these products, that will ensure proper shipping and storing conditions. While many of the containers and methods employed in the past have met the needs of producers and retailers, these containers and methods usually required a considerable amount of handling. Additionally, there is always a need for containers and methods which improve the shelf life, appearance, and freshness of perishable products such as fruits and vegetables.

SUMMARY OF THE INVENTION

It is the object of the present invention to provide a container system for shipping and storing products.

It is another object of the present invention to provide a container system for the shipping and storing of products, wherein inner and outer containers are provided, and wherein the inner container can be opened, without accessing the interior of the outer container or removing the container from a stack of containers, in order to provide increased ventilation to the products.

It is yet another object in the present invention to provide a container system for perishable products wherein said system comprises inner and outer containers, and wherein the inner container comprises a flexible bag that may be readily opened without opening the outer container.

It is still another object of the present invention to provide a container system for the shipping and storing of bananas wherein the container system comprises a rigid outer container having a plurality of ventilation openings and a central opening in its lid, and an inner bag having a plurality of ventilation openings vertically alignable with ventilation openings on the outer container, and wherein the inner bag may be opened to provide further ventilation to the bananas.

It is another object of the present invention to provide a method for packing, shipping and storing products such as fruits and vegetables.

It is yet another object of the present invention to provide a method for packing, shipping and storing perishable products, comprising the steps of inserting an inner bag into an outer container, placing the perishable products inside the inner bag, closing the inner bag, shipping the containerized products to a second location, and opening the inner bag without accessing the interior of the outer container or removing the container from a stack, thereby increasing the ventilation to the perishable products.

Additional objects, advantages and other novel features of the invention will be set forth in the description that follows, and will also be apparent to those skilled in the art upon examination of the following or may be learned with the practice of the invention.

The foregoing objects can be accomplished, in accordance with one aspect of the present invention, by providing a container system for the shipping and storing of product, comprising in combination:

(a) a substantially rigid outer container having at least one ventilation opening;

(b) a closable inner container positioned within the outer container for receiving the product, the inner container having a bottom portion and a top portion; and (c) means attached to the top portion of the inner container for opening the inner container so as to provide increased ventilation to the product.

The inner container preferably comprises a flexible bag having a sealed bottom as its bottom portion, an open top adjacent the top portion, and a perforation extending about at least a portion of the bag, and wherein the opening means opens the bag by severing the bag at the perforation. The perforation is preferably positioned between the top and bottom portions of the bag, adjacent the top portion, and preferably extends across substantially the entire width of the bag. The opening means preferably comprises a cord secured to the bag, preferably between the open top and the perforation such that when the cord is pulled the bag will tear at the perforation thereby opening the bag (by removing the top portion) and providing increased ventilation to the product through the ventilation opening in the outer container. The outer container may comprise a rectangular box having a top and at least one cord passageway, and a central ventilation opening in the top, wherein the cord extends through at least one cord passageway from the interior of the box.

The cord may be secured to bag by tying the cord about the circumference of the bag, thereby also closing and substantially sealing the top portion of the bag. In addition, the cord passageway may a hand slot for grasping the outer container, wherein the cord extends through this hand slot. The outer container may optionally have two such hand slots, and the cord may extend out both of these slots. The bag itself may also have a plurality of ventilation apertures positioned adjacent the bottom portion the bag. The bag may also be positioned within the outer container such that the top portion of the bag is positioned directly beneath the central opening in the top of the outer container, so that if the top portion of the bag is removed, the product will be exposed to the ambient through the central opening.

The foregoing objects may also be accomplished by providing a method of packing, shipping and storing product, comprising the steps of:

(a) providing an inner and outer container for the product at a first location, the outer container being of a substantially rigid construction, and having at least one ventilation opening, and wherein the inner container has a top portion, a bottom portion, and an open end adjacent the top portion;

(b) placing the inner container within the outer container;

(c) placing the product inside the inner container;

(d) providing a means attached to the top portion for opening the inner container;

(e) closing the inner container so that the inner container is substantially sealed at the top portion to thus containerize the product (f) shipping the containerized product to a second location;

(g) opening the inner container using the opening means, so as to provide increased ventilation to the product within the inner container through the at least one ventilation opening; and (g) storing the containerized product at the second location.

The inner container may comprise a flexible bag having a perforation between the top and bottom portions, so that the opening step severs the bag at the perforation, preferably removing the top portion of the bag, thereby providing the increased ventilation. The opening means may comprise a cord affixed to the top portion of the bag, so that the opening step comprises pulling the cord to remove the top portion of the bag. The outer container is preferably a rectangular box having a top and a central ventilation opening in the top, and the top portion of the bag can thus be positioned directly beneath the central ventilation opening prior to the opening step so that the opening step exposes the product to the ambient through the central opening. A portion of the cord is also preferably positioned external of the outer container so that the opening step can be accomplished without accessing the interior of the outer container.

In both the container system and the method described above, the product may be fresh produce (i.e., fruits and vegetables), such as bananas.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Reference will now be made in detail to the presently preferred embodiment of the invention, an example of which is illustrated in the accompanying drawings, wherein like numerals indicate the same elements throughout the views.

Figure 2:
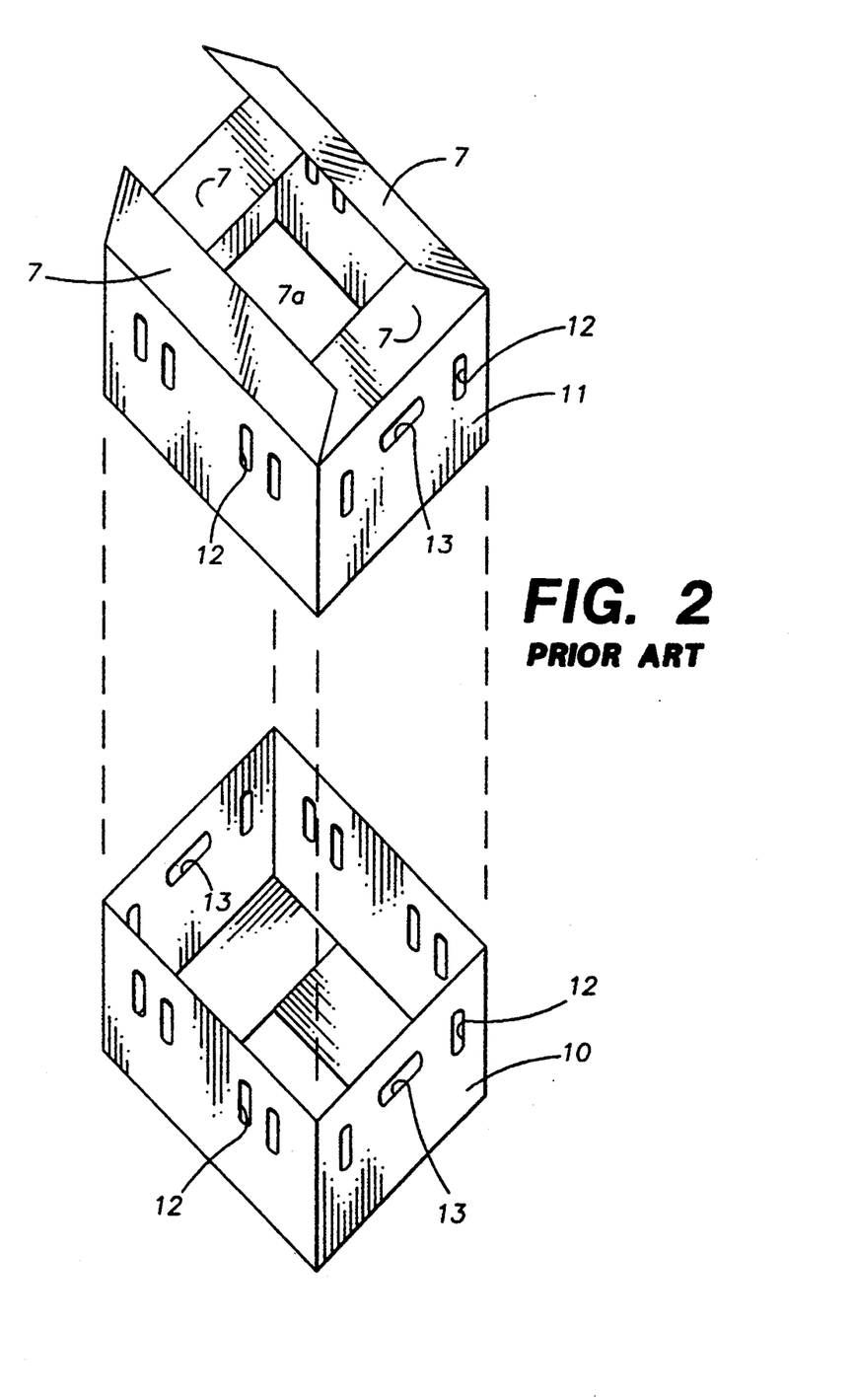
FIG. 2 is a perspective view of a prior art container used for shipping products such as fresh fruit and vegetables.

FIG. 2 depicts a prior art container commonly employed for shipping fresh fruits and vegetables such as bananas. The container of FIG. 2 generally comprises a base portion 10 and a top portion 11, and is commonly referred to as a full-telescoping, half-slotted container (HSC). Top portion 11 and base portion 10 are of approximately equal depth, and top portion 11 telescopically slides over base portion 10 to complete the container. Alignable ventilation apertures 12 are provided on the periphery of both portions of the container, as well as alignable hand slots 13 for grasping the container. Hand slots 13 also provide ventilation to the interior of the container. The top and bottom portions each have flaps which are folded over and glued to one another in order to close each portion. When these flaps are folded over, however, a central ventilation opening will be provided in both top portion 11 and bottom portion 10. Top portion 11, for example, has top flaps 7 which are folded over in the manner shown to define central ventilation opening 7a through which the product within the container will be visible.

When perishable products such as bananas are shipped in the container of FIG. 2, a plastic inner wrap usually must be employed in order to protect the bananas. This inner wrap is typically a tube made of thin plastic, and has a series of ventilation slits provided about the entire surface of the tube. The plastic tube is typically placed in base portion 10, and the open edges of the tube are draped over the sidewalls of base portion 10. In this fashion, the bananas can then be layered within the tube which is contained in base portion 10. Once the bananas have been loaded into the plastic tube and base portion 10, the edges of the tube are merely draped atop the bananas in a loose fashion. In this manner, ventilation can be provided to the bananas through the ventilation slits, including the necessary circulation of ethylene gas to initiate the ripening process.

One drawback of the container of FIG. 2 when it is employed with the plastic tube referred to above, is that once the bananas arrive at the retail establishment, it is difficult to provide the necessary cooling and ventilation needed to retard the ripening process. The bananas will produce a considerable amount of heat and ethylene while they are ripening. If the bananas are not cooled back to a temperature of approximately 58° F., and if the ethylene gas is not permitted to escape from the container, the bananas will continue to ripen at an accelerated rate thereby reducing their shelf life.

In order to remove the excess heat and ethylene produced by the ripening bananas, the retailer must remove top portion 11, and open the inner plastic tube in order to expose the bananas. In this fashion, the heat and ethylene will be permitted to escape. Obviously, however, this necessitates removing the containers from their ordered arrangement on the pallets. The retailer must then restack the containers of bananas atop one another, usually in a staggered fashion, so that the necessary ventilation will be provided to the bananas. In fact, the retailer must often stack the containers in a less compact arrangement than was present when the containers were on the pallets, so that sufficient amounts of cooled air can be circulated about the bananas.

Figure 3:
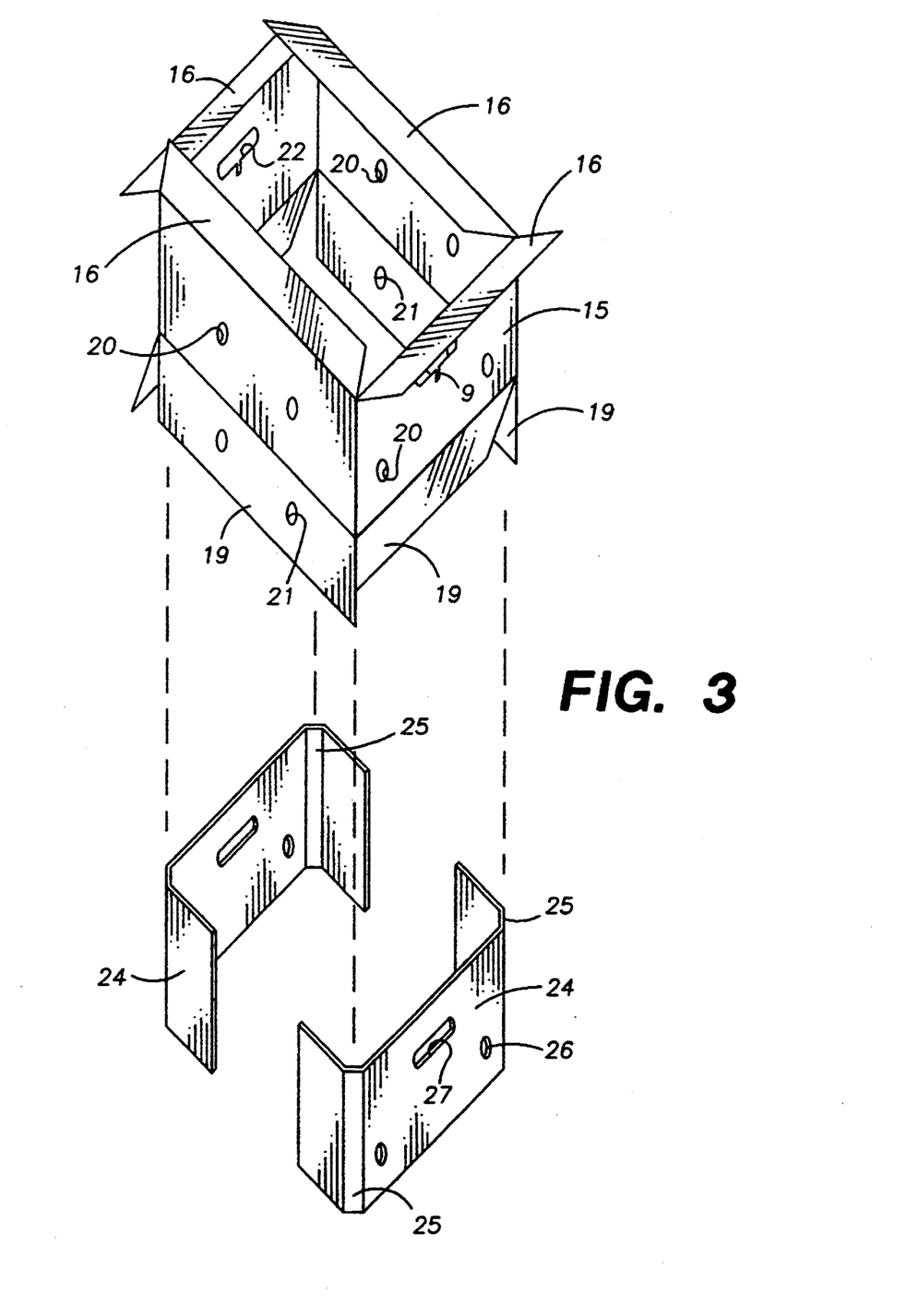
FIG. 3 is a perspective view of the outer container of one embodiment of the present invention.

FIG. 3 depicts an improved container design which offers numerous advantages over that shown by FIG. 2. Container 15 of FIG. 3 is similar in construction to base portion 10 of the prior art design shown in FIG. 2. Like any common rectangular container (i.e., a box), rectangular container 15 comprises four vertical sidewalls and attached bottom flaps 19. Bottom flaps 19 are folded over and glued in the conventional manner to thereby form the container. The width of bottom flaps 19 are such that the bottom of container formed by flaps 19 will not be a continuous surface. In other words, as is the usual case with containers wherein ventilation is important, a central opening will be provided in the bottom of container 15 when flaps 19 are folded over and sealed to one another in a conventional fashion (such as by gluing).

Container 15 also has a plurality of ventilation apertures 20 provided in its sidewalls, as well as ventilation apertures 21 provided in bottom flaps 19. Any number of ventilation apertures may be provided depending upon the product being shipped as well as considerations of container strength. As was the case in the container of FIG. 2, hand slots 22 are provided in the sidewalls of container 15, and the slots serve the dual purpose of providing added ventilation as well as a means for grasping the container.

Figure 5:
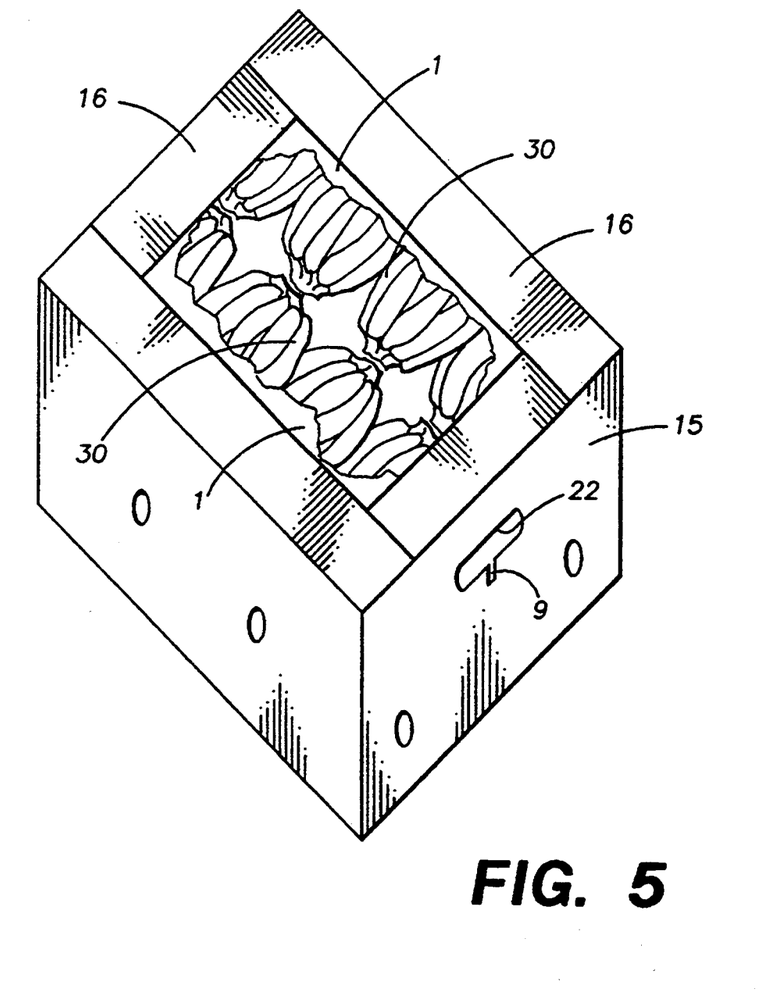
FIG. 5 is a perspective view of the container system of one embodiment of the present invention, after the inner bag has been opened.

Instead of a separate telescoping top portion as was the case in the container of FIG. 2, container 15 of FIG. 3 has integral top flaps 16. Once the products to be shipped are loaded within container 15, top flaps 16 are folded over in the conventional fashion and glued, much the same way that top flaps 7 on top portion 11 on the container of FIG. 2 would be. Top flaps 16 are preferably of a slightly shorter width, however, than top flaps 7 in FIG. 2. This provides a larger central ventilation opening, and therefore increased ventilation for the product. The central ventilation opening is shown by FIG. 5 as the area in the top of assembled container 15 through which the bananas 30 are visible. It has been found that an integral lid provides sufficient rigidity and strength, particularly when the insert to be described is employed.

The container of FIG. 3 also results in significant cost savings, since less material will be employed for the construction of the container (as compared to that of FIG. 2). Shipping containers such as those of FIGS. 2 and 3, are often made of corrugated board, and are generally disposed of after a single use. Thus, employing the container design of FIG. 2, even when the insert described below is employed, results in a significant reduction in the amount of disposed material.

In many instances, it may be necessary to reinforce container 15. Thus, as further shown in FIG. 3, support inserts 24 are preferably utilized. Inserts 24 fit within container 15 against the sidewalls of the container. Obliquely angled corner portions 25 on support inserts 24 provide added support, as a stronger triangular structure will be situated in each corner of container 15 when inserts 24 are utilized. When ventilation apertures 20 are provided in the sidewalls of container 15, corresponding alignable ventilation apertures 26 can be provided in inserts 24 so that unimpeded fluid communication to the interior of the container will be maintained. In addition, alignable hand slots 27 are also provided in support inserts 24 and ensure that hand slots 22 on container 15 can serve their intended dual purpose as previously described.

As stated previously, many products such as fruits and vegetables have varying ventilation and temperature requirements, and the prior art methods have been unable to effectively deal with these requirements. The plastic inner wrap or tubes utilized in the shipment of bananas, for example, require manual unstacking and restacking by the retailer, and do not provide the most protective environment for the bananas during shipment. In order to alleviate these problems, a novel inner container has been developed. While this inner container is preferably employed with the improved container design of FIG. 3, it can be effectively used with numerous other container or box designs, including that of FIG. 2.

Figure 1:
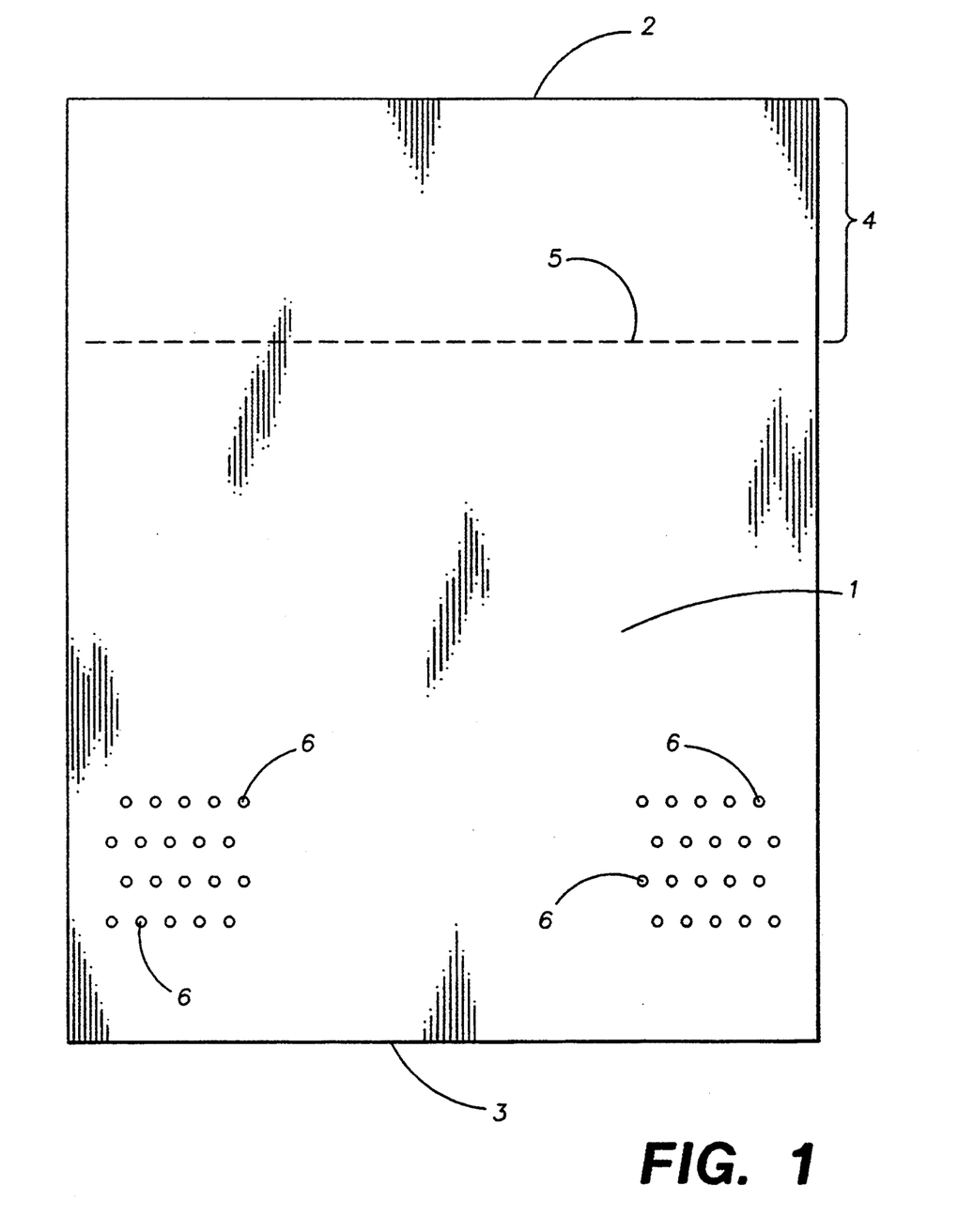
FIG. 1 is a side plan view of the inner bag of one embodiment of the present invention.
Figure 4:
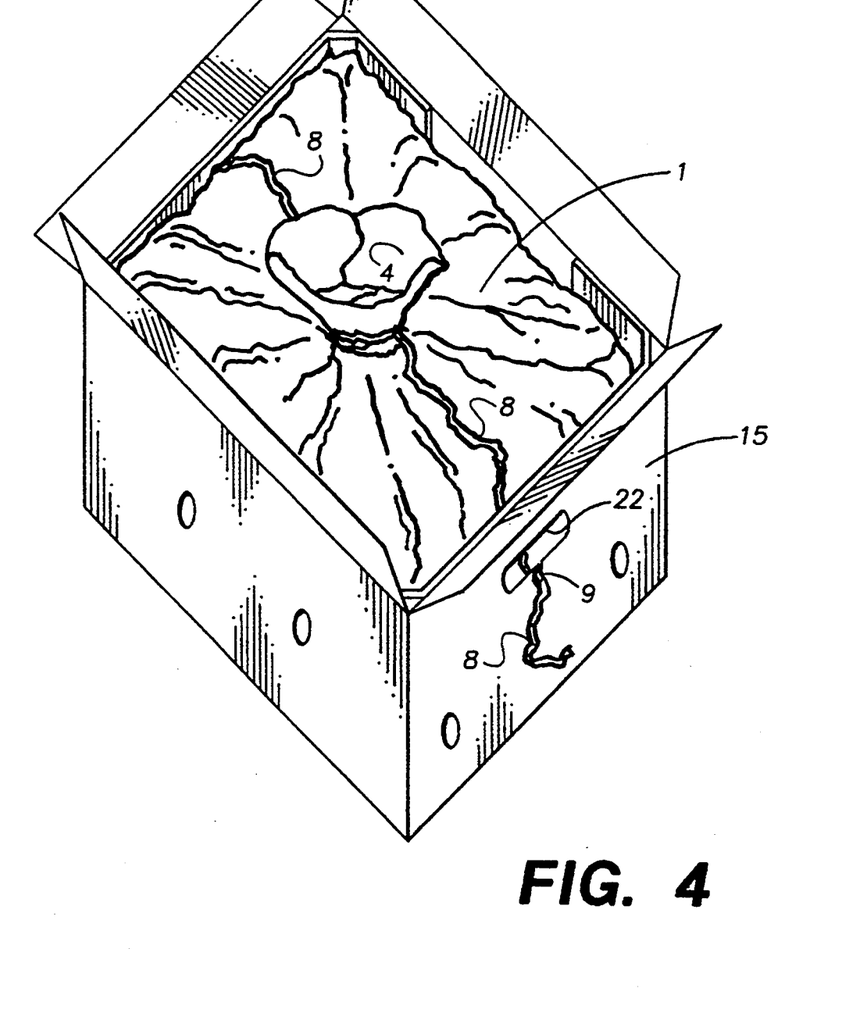
FIG. 4 is a perspective view of the container system of one embodiment of the present invention, wherein the outer container has not yet been closed.

FIG. 1 depicts the inner container of the present invention. The inner container preferably comprises a flexible bag 1 having an open end 2 and a sealed bottom end 3, and is identical in this respect to a typical household trash bag. Bag 1 can be constructed of any of a number of materials, and is preferably made of substantially clear, flexible plastic such as that typically used for plastic bags, however bag 1 could also be manufactured of opaque material. It should be noted that bag 1 is depicted in FIGS. 4 and 5 as opaque merely for clarity. The presently preferred material for bag 1 is linear low density polyethylene, having small amounts of additional additives to ensure that bag 1 may be easily opened and be of adequate strength, while maintaining its inexpensiveness. The exact formula for the material of bag 1 is not critical, and various combinations of materials well known to those skilled in the art can be readily employed.

Bag 1 differs from other plastic bags in that bag 1 also has a perforation 5 located adjacent top portion 4 of bag 1. Top portion 4 is defined as the area between open end 2 and perforation 5. As shown by FIG. 1, perforation 5 extends substantially across the entire width of bag 1, but not entirely. This ensures that when bag 1 is opened, for example, by sweeping the bag through the air to allow air to enter open end 2, such opening of the bag will not cause the bag to tear at perforation 5. In addition, a plurality of bags are usually manufactured on a roll, with individual bags separated by larger perforations between bags. Thus, perforation 5 only extends partially across the width of bag 1 so that when individual bags are removed from the role, the roll will tear between bags, rather than an individual bag tearing at perforation 5.

Bag 1 also has a plurality of ventilation apertures 6 located adjacent bottom end 3 at each corner of the bag. It should be noted that bag 1 is actually tubular in nature, and FIG. 1 depicts bag 1 in a flat form. Ventilation apertures 6 are preferably arranged in a series of rows, with the apertures in adjacent rows offset from one another in order to strengthen bag 1. If ventilation apertures 6 are not offset, the bag will be more likely to tear at the apertures. Preferably, bag 1 has twenty ventilation apertures 6 located adjacent each of the lower corners of the bag, or a total of eighty such apertures. The preferred positioning of ventilation apertures 6, as shown in FIG. 1, will help ensure that the apertures align properly with the various apertures on container 15 of FIG. 3.

Bag 1 of FIG. 1 is designed to be used with an outer container generally comprising a box typically made of cardboard, such as those of FIGS. 2 and 3, and preferably that of FIG. 3. In order to employ flexible bag 1, the container of FIG. 3 is first constructed by sealing bottom flaps 19 in their closed position, and preferably placing support inserts 24 within container 15. Bag 1 is then opened in the typical manner in which one would open a plastic bag (i.e., by forcing air into open end 2). Bag 1 is then inserted into container 15 with open end 2 of bag 1 extending out the top of container 15. Open end 2 is then draped about the outside of the sidewalls of container 15, thereby completely exposing the interior of bag 1 which is in place in container 15. The products to be packaged are placed within bag 1 which is positioned within container 15. When the product being loaded is a fresh fruit such as bananas, the product is often loaded within bag 1 and container 15 in an orderly fashion. For example, it is preferred that bananas be loaded into bag 1 in four layers. This is the typical manner in which bananas are loaded into containers, however it has been found that the necks of each bunch of bananas should face outwardly in the first layer, and inwardly for the remaining three layers (as shown by FIG. 5). This ensures that the bananas will not extend above the sidewalls of container 15, and thus ensures that top flaps 16 can be sealed in the manner described previously.

Once the product has been loaded within bag 1, which is in place in container 15, top portion 4 of bag 1 is cinched together by hand in the manner one typically employs for plastic bags, such as a consumer might do with a plastic garbage bag. After top portion 4 of bag 1 has been cinched together by hand, there is a need to secure the cinched top portion in order to seal the bag closed. This is accomplished by providing cord 8. Cord 8 is preferably manufactured of polypropylene twine, however it can be manufactured of any of a number of materials including various fibers, and polypropylene twine is merely preferred for its strength and cost. Cord 8 is securely tied about cinched top portion 4 using any type of knot which will not become loosened when cord 8 is pulled. Thus, a simple square knot can be employed to securely cinch top portion 4 of bag 1 with cord 8. It is preferred that cord 8 be knotted about top portion 4 (i.e., between open end 2 and perforation 5) somewhere near the middle of the length of cord 8, and that cord 8 be of sufficient length so that each end of cord 8 may extend through each hand slot 22 of container 15 as shown by FIG. 4. In other words, when cord 8 is knotted about top portion 4 of bag 1, thereby sealing bag 1 shut, each end of cord 8 should extend through hand slots 22 located on opposite sidewalls of container 15.

It is also preferred that a small slit 9 be provided in the bottom of each hand slot 22 (as shown by FIG. 3), and a corresponding slit may also be provided on hand slot 27 of each insert 24 in the same location. When the ends of cord 8 extend out hand slots 22, a portion of cord 8 may be inserted within slit 9 (and the corresponding slits on inserts 24) in order to anchor cord 8 to container 15. This will ensure that the ends of cord 8 will remain outside of container 15 during transit. After cord 8 has been positioned in this fashion, top flaps 16 of container 15 may be folded over and secured in the manner described previously, thereby containerizing the product. The containerized product may then be stacked upon pallets in various commonly used patterns for shipping and/or storage. An additional feature of the system of the present invention is that since cord 8 extends out of each hands slot 22, cord 8 will generally be accessible even when a plurality of the containers are tightly positioned on a pallet, since most stacking patterns commonly employed will ensure that at least one hand slot 22 of each container 15 is located somewhere about the periphery of the pallet load readily accessible without requiring one to remove the containers from the pallet.

As described previously, many products such as bananas require ventilation and/or temperature control in order to ensure that the goods arrive at their destination in a marketable condition. Many of these products also require varying amounts of ventilation during shipping. When goods such as bananas have been packaged in the fashion described above within sealed bag 1 placed within container 15, ventilation can still be provided to the bananas through ventilation apertures 6 on bag 1. When the preferred pattern for ventilation apertures 6 as shown by FIG. 1 is employed, at least a portion of ventilation apertures 6 will be substantially in vertical alignment with one or more ventilation apertures 20 and 21 on container 15. This permits cooling or heating air to be circulated amongst the bananas when necessary, and also will allow the ethylene gas used for ripening to enter bag 1 containing the bananas. Because the top portion of bag 1 is sealed, however, a "micro-climate" is created within bag 1. While ventilation apertures 6 in bag 1 permit air and ethylene to be circulated about the bananas, the sealed nature of bag 1 at top portion 4 significantly limits the amount of moisture which is lost to the environment.

The ability of the container system and method of the present invention to reduce the amount of moisture lost from the inner container is significant for the shipment of products such as bananas, as significant moisture losses usually take place when conventional packaging systems are employed. For example, bananas are typically packaged in 40 pound boxes. The 40 pound weight, however, refers to the weight of the bananas at the time of delivery to the retailer. Due to moisture losses during shipping, approximately 41.5 to 42.0 pounds of bananas must be packaged into each box prior to shipping. Since such a load of bananas conventionally packaged will lose up to two pounds of moisture, each box of bananas will arrive at the retailer weighing approximately 40 pounds, as required. When the packaging system and methods of the present invention are employed, however, moisture losses are reduced by approximately 0.5 pounds per box. Thus, the weight of the bananas packaged into the container system prior to shipping can be approximately 0.5 pounds less when the present invention is employed, as compared to conventional packaging systems. Additionally, since the number of full banana boxes which may be placed into the large shipping receptacles is limited by total weight, more loaded boxes of bananas can be placed within each receptacle, since each box of bananas will weigh approximately 0.5 pounds less when the packaging system of the present invention is employed. For the typical large shipping receptacle employed for bananas, the packaging system and methods of the present invention results in the ability to load approximately 28 more banana boxes into each shipping receptacle.

As also mentioned previously, once the boxes arrive at the retailer, or even at some other point in time, it may be necessary to significantly increase the amount of ventilation that can be provided to the product. This is particularly true for bananas, since, as mentioned previously, the retailer usually must increase the ventilation in order to slow the ripening process. At this point, cord 8 comes into play. When the retailer receives a shipment of loaded banana boxes, for example, the retailer merely firmly pulls cord 8 and top portion 4 of bag 1 is completely severed from the remainder of the bag due to perforation 5. Top portion 4 can then be readily pulled through hand slot 22, thereby completely removing top portion 4 of bag 1 from the box of bananas or other products. As shown by FIG. 5, this will completely expose the interior of bag 1 (in this case the load of bananas 30) through the central opening provided in the top of container 15. The remaining portion of bag 1 is also visible in FIG. 5 through the central opening. Thus, there is no longer a need for the retailer to open the boxes to provide further ventilation to the bananas. In fact, if sufficient ventilation can be provided to the boxes while they are on the pallet, there will no longer be a need for the retailer to unstack the banana boxes to increase the ventilation due to the increased size of the central ventilation opening in the top of container 15, thereby greatly reducing the amount of space needed for storage of the bananas and the labor required of the retailer. Additionally, since cord 8 is accessible without a need for the retailer to access the interior of container 15 (e. g., either by opening the container or reaching through the central opening of the container top), there is no need for the retailer to remove boxes from the pallet in order to open the inner container. Thus, the inner container may be opened even when a plurality of boxes are stacked atop one another.

Testing of the packaging system and methods of the present invention has also demonstrated that the reduction in moisture loss and the ability of the retailer to provide increased ventilation to the bananas will result in a marked improvement in the quality and appearance of the bananas. When bananas shipped in the conventional manner are placed side-by-side with those shipped using the container system and methods of the present invention, the improvements in product quality are readily apparent even to the unexperienced observer. The bananas have an overall fresher appearance and there is considerably less brown spotting on the bananas. This will, of course, result in greater consumer acceptance of the bananas.

The foregoing description of a preferred embodiment is by no means exhaustive of the variations in the present invention that are possible, and has been presented only for purposes of illustration and description. Obvious modifications and variations will be apparent to those skilled in the art in light of the teachings og the foregoing description. For example, various alternative means for tearing open the inner container could be employed, such as tabs molded into the inner container itself. Additionally, it is certainly within the scope of the present invention to use an alternative means for sealing the inner container. For example, a pull cord can be secured to the container, and a separate sealing means employed. Additionally, various alternative materials could be used to manufacture the various components of the system and method. Thus, it is intended that the scope of the present invention be defined by the claims appended hereto.

What we claim is:

1. A container system for the shipping and storing of product, comprising in combination:

(a) a substantially rigid outer container having at least one ventilation opening;

(b) a closable inner container positioned within said outer container for receiving said product, said inner container having a bottom portion and a top portion; and (c) means attached to said top portion of said inner container for opening said inner container so as to provide increased ventilation to said product, said opening means positioned so as to be accessible from the exterior of said outer container.

2. The container system of claim 1, wherein said inner container comprises a flexible bag having an open top adjacent said top portion, and a perforation extending about at least a portion of said bag, and wherein said opening means opens said bag by severing the bag at said perforation.

3. The container system of claim 2, wherein said opening means comprises a cord secured to said bag, such that when said cord is pulled said bag will tear at said perforation thereby opening said bag and providing said increased ventilation.

4. A container system for the shipping and storing of product, comprising in combination:

(a) a substantially rigid outer container having at least one ventilation opening;

(b) a closable inner container positioned within said outer container for receiving said product, said inner container comprising a flexible bag having a bottom portion, a top portion, an open top adjacent said top portion, and a perforation extending about at least a portion of said bag, and wherein said opening means opens said bag by severing the bag at said perforation; and (c) means attached to said top portion of said inner container for opening said inner container so as to provide increased ventilation to said product, wherein said opening means comprises a cord secured to said bag, such that when said cord is pulled said bag will tear at said perforation thereby opening said bag and providing said increased ventilation;

wherein said outer container comprises a rectangular box having a top and at least one cord passageway, and a central ventilation opening in said top, and wherein said cord extends through at least one cord passageway from the interior of said box.

5. The container system of claim 4, wherein said perforation is located between said top and bottom portions, and is positioned adjacent said top portion, wherein said perforation extends substantially across the entire width of said bag, and further wherein said cord is secured to said bag between said perforation and said open top such that when said cord is pulled, said top portion of said bag will be removed.

6. The container system of claim 5, wherein said cord is secured to said bag by tying the cord about the circumference of said bag, thereby also closing said bag.

7. The container system of claim 6, wherein said bag has a plurality of ventilation apertures positioned adjacent the bottom portion of said bag.

8. The container system of claim 5, wherein at least one cord passageway comprises a hand slot for grasping said outer container, and wherein said cord extends through said hand slot.

9. The container system of claim 4, wherein said bag is positioned within said outer container such that said top portion is positioned directly beneath said central opening in said top of said outer container, so that if said top portion of the bag is removed, said product will be exposed to the ambient through said central opening.

10. The container system of claim 9, wherein said outer container has at least two cord passageways defined by hand slots, wherein each of said hand slots has a notch in its periphery and further wherein said cord extends through each hand slot and is secured in said notches.

11. The container system of claim 1, wherein said opening means comprises a cord, and wherein said cord is secured to said inner container by being tied about the circumference of said top portion of said inner container, thereby also closing said inner container.

12. The container system of claim 1, wherein said outer container comprises a substantially rigid rectangular outer container having a top, a bottom, and a plurality of sidewalls, and wherein said opening means is positioned so as to be accessible from a position adjacent one of said sidewalls, thereby permitting said opening means to be operable without a need to access the top of said outer container.

13. A container system for the shipping and storing of produce, comprising in combination:

(a) a substantially rigid rectangular outer container having a top, a bottom, a plurality of sidewalls, and a ventilation opening in said top;

(b) a closable inner container comprising a flexible bag positioned within said outer container for receiving said produce, said bag having a sealed bottom portion, a top portion, and a perforation between said top and bottom portions adjacent said top portion, wherein said perforation extends across the width of said bag; and (c) a cord attached to said top portion of said inner container wherein sad cord will remove said top portion of said bag when said cord is pulled, thereby opening said bag and provide increased ventilation to said produce through said ventilation opening;

wherein said cord is secured to said bag by tying the cord about the circumference of said bag, thereby also closing said bag.

14. A container system for the shipping and storing of produce, comprising in combination:

(a) a substantially rigid rectangular outer container having a top, a bottom, a plurality of sidewalls, and a ventilation opening in said top;

(b) a closable inner container comprising a flexible bag positioned within said outer container for receiving said produce, said bag having a sealed bottom portion, a top portion, and a perforation between said top and bottom portions adjacent said top portion, wherein said perforation extends across the width of said bag; and (c) a cord attached to said top portion of said inner container wherein sad cord will remove said top portion of said bag when said cord is pulled, thereby opening said bag and provide increased ventilation to said produce through said ventilation opening wherein at least a portion of said cord is positioned external of said outer container.

15. The container system of claim 14, wherein said cord is tied about said top portion thereby not only attaching said cord to said top portion, but also sealing said bag.

16. The container system of claim 15, wherein said outer container has at least one cord passageway through which a portion of said cord extends.

17. The container system of claim 16, wherein said cord passageway comprises a hand slot for grasping said container.

* * * * *